United States Patent
Hwang et al.

(10) Patent No.: US 10,252,722 B2
(45) Date of Patent: Apr. 9, 2019

(54) METHOD FOR CONTROLLING MANUAL DRIVING MODE OF AUTONOMOUS VEHICLE

(71) Applicants: Hyundai Motor Company, Seoul (KR); Kia Motors Corp., Seoul (KR)

(72) Inventors: Sang Woo Hwang, Seoul (KR); Hyeon Seok Cho, Pyeongtaek-si (KR); Byung Rim Lee, Seongnam-si (KR); Young Dae Park, Asan-si (KR); Min Jun Kim, Busan (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 17 days.

(21) Appl. No.: 15/804,963

(22) Filed: Nov. 6, 2017

(65) Prior Publication Data

US 2018/0362043 A1 Dec. 20, 2018

(30) Foreign Application Priority Data

Jun. 19, 2017 (KR) .................. 10-2017-0077180

(51) Int. Cl.
*B60W 30/182* (2012.01)
*G05D 1/00* (2006.01)
*B60W 50/14* (2012.01)

(52) U.S. Cl.
CPC .......... *B60W 30/182* (2013.01); *B60W 50/14* (2013.01); *G05D 1/0088* (2013.01); *B60W 2710/20* (2013.01); *B60W 2710/30* (2013.01)

(58) Field of Classification Search
None
See application file for complete search history.

(56) References Cited

U.S. PATENT DOCUMENTS

| 8,825,258 B2 | 9/2014 | Cullinane et al. | |
| 2005/0234622 A1* | 10/2005 | Pillar | A62C 27/00 701/41 |
| 2018/0229724 A1* | 8/2018 | Gutmann | G01S 15/931 |

FOREIGN PATENT DOCUMENTS

| JP | 10-329575 A | 12/1998 |
| KR | 10-2016-0118182 A | 10/2016 |
| KR | 10-2017-0025552 A | 3/2017 |

* cited by examiner

*Primary Examiner* — Richard M Camby
(74) *Attorney, Agent, or Firm* — Morgan, Lewis & Bockius LLP

(57) ABSTRACT

A method for controlling a manual driving mode includes manual mode detecting step detecting whether a vehicle switched from autonomous to manual mode; first step controlling angle of tire and steering angle of a steering wheel using travel route information when switching to manual mode is detected; delay time determination step determining a delay time of change of the angle of the tire with change of the steering angle of the steering wheel by the change in the angle of the tire with the change in the steering angle of the steering wheel for predetermined time; delay time comparison step comparing the determined delay time with predetermined time period; second step controlling only the steering angle of the steering wheel using travel route information when delay time is within the predetermined time period; and third step controlling angle of the tire by steering angle of the steering wheel.

6 Claims, 2 Drawing Sheets

METHOD FOR CONTROLLING MANUAL DRIVING MODE OF AUTONOMOUS VEHICLE

CROSS-REFERENCE(S) TO RELATED APPLICATIONS

The present application claims priority to Korean Patent Application No. 10-2017-0077180, filed on Jun. 19, 2017, the entire contents of which is incorporated herein for all purposes by this reference.

BACKGROUND OF THE INVENTION

Field of the Invention

The present invention relates to a method for controlling a manual driving mode of an autonomous vehicle, and, more particularly, to a method for controlling a manual driving mode of an autonomous vehicle which is configured to prevent misalignment of a tire steering angle and a steering-wheel steering angle when the autonomous vehicle is to switch from an autonomous driving mode to the manual driving mode.

Description of Related Art

Generally, an autonomous vehicle is configured to recognize road traffic conditions including nearby vehicles, pedestrians, obstacles, lanes, traffic signals, and the like using an advanced driving assist system (ADRS) attached thereto and travels based on the recognized information.

In addition, a steering by wire (SBW) system has a steering wheel module and a tire steering module that are physically separated, and thus may maintain the steering wheel in a stationary state despite steering of the tires.

The above SBW system feature may prevent the steering wheel from continuously rotating when the tires are steered in the autonomous driving mode, but may also allow the steering wheel to be temporarily kept in a storage area wherein a driver can restore the steering wheel only when the driver intends to control the vehicle in the manual driving mode.

The present invention is intended to accurately align a tire steering angle with a steering-wheel steering angle and ensure smooth and safe mode switching when an autonomous vehicle provided with the SBW switches from the autonomous driving mode to the manual driving mode during travel.

The information disclosed in this Background of the Invention section is only for enhancement of understanding of the general background of the invention and should not be taken as an acknowledgment or any form of suggestion that this information forms the prior art known to a person skilled in the art.

BRIEF SUMMARY

Various aspects of the present invention are directed to providing a method for controlling a manual driving mode of an autonomous vehicle which is configured for realizing both an autonomous driving mode and the manual driving mode while seamless switching from the autonomous driving mode to the manual driving mode, preventing a misalignment between corresponding angles of the steering wheel and the tires.

In accordance with an aspect of the present invention, the above and other objects can be accomplished by the provision of a method for controlling a manual driving mode of an autonomous vehicle, the method including a manual mode detecting step wherein a controller is configured to detect whether the vehicle is switched from an autonomous driving mode to the manual driving mode; a first control step wherein the controller is configured to control an angle of a tire and a steering angle of a steering wheel based on travel route information when switching to the manual driving mode is detected as a result of the manual mode detecting step; a delay time determination step wherein the controller is configured to determine a delay time of a change of the angle of the tire with respect to a change of the steering angle of the steering wheel by comparing the change in the angle of the tire with the change in the steering angle of the steering wheel for a predetermined time period after the first control step; a delay time comparison step wherein the controller is configured to compare the determined delay time with a predetermined time period after the delay time determination step; a second control step wherein the controller is configured to control only the steering angle of the steering wheel based on the travel route information when the delay time is within the predetermined time period as a result of the delay time comparison step; and a third control step wherein the controller is configured to control the angle of the tire based on the steering angle of the steering wheel controlled through the second control step.

The method may further include a driver operation detecting step wherein the controller is configured to detect whether the steering wheel is operated by a driver after the third control step; and a manual driving mode execution step wherein the controller is configured to terminate, when operation of the steering wheel by the driver is detected as a result of the driver operation detecting step, control of the steering angle of the steering wheel using the travel route information and controlling the angle of the tire according to the steering angle of the steering wheel.

In performing the driver operation detecting step, the controller may be configured to detect a torque value of the steering wheel and detect, when the detected torque value deviates from a predetermined torque map, that the steering wheel is operated by the driver.

When operation of the steering wheel by the driver is detected as a result of the driver operation detecting step, the controller may be configured to perform the second control step again. That is, when the driver does not operate the steering wheel, although driving in the manual driving mode is allowed, the controller may be configured to continuously control the steering wheel based on the travel route information, preventing the autonomous driving mode from being abruptly stopped, causing an accident.

The controller may be configured to operate a notification device from an initial time of execution of the first control step to a time immediately before execution of the second control step to let the driver recognize that the vehicle is being switched to the manual driving mode.

When the delay time is not within the predetermined time period as a result of the delay time comparison step, the controller may be configured to perform the first control step again.

According to the method for controlling the manual driving mode of the autonomous vehicle having the above-described structure, a feeling of poor operability may be prevented from being provoked when the vehicle is switched from the autonomous driving mode to the manual driving mode in which the driver manually performs driving operations. The method may also improve a driving performance and convenience of the vehicle, ultimately improving marketability of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
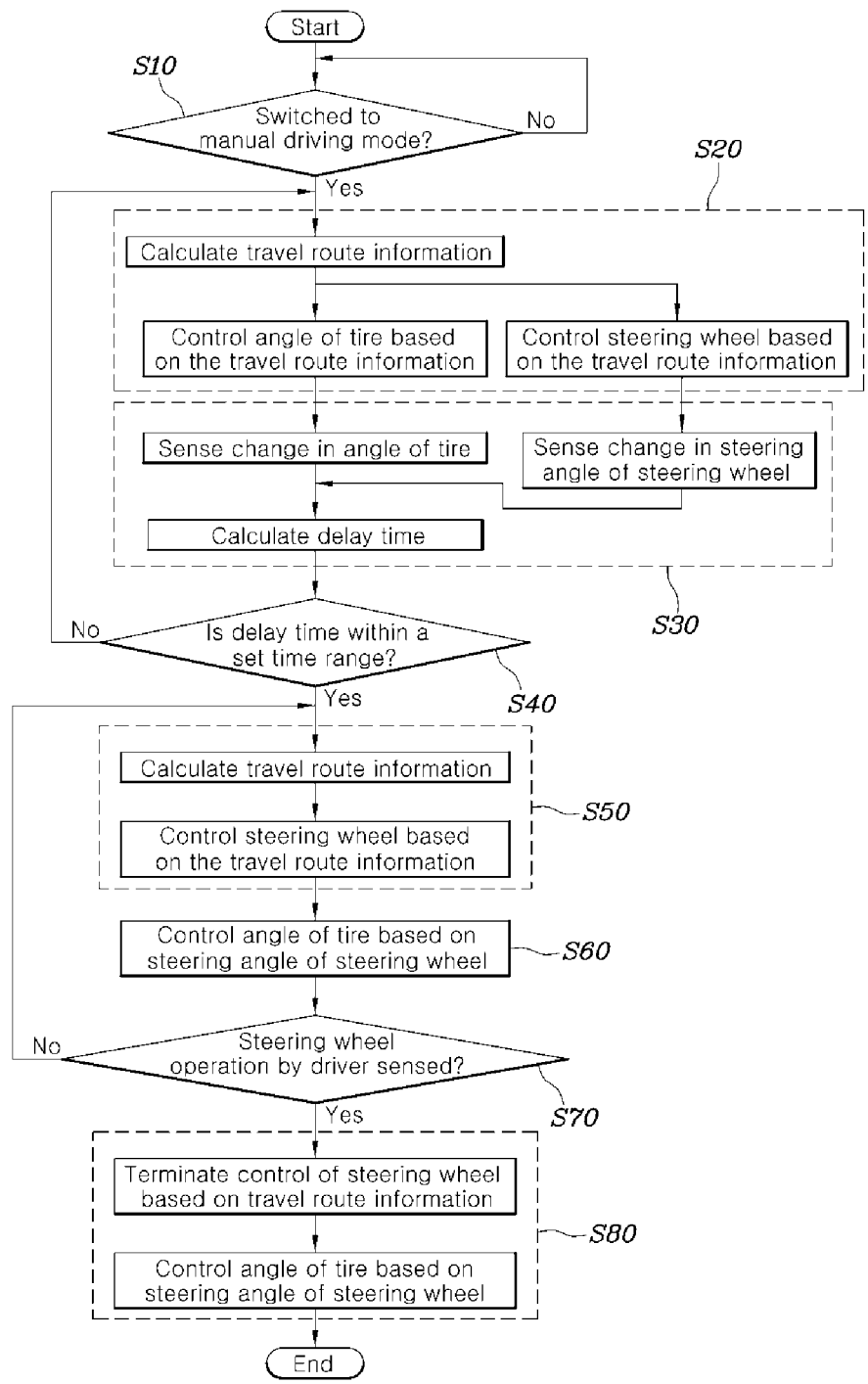
FIG. 1 is a flowchart illustrating a method for controlling a manual driving mode of an autonomous vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalents parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
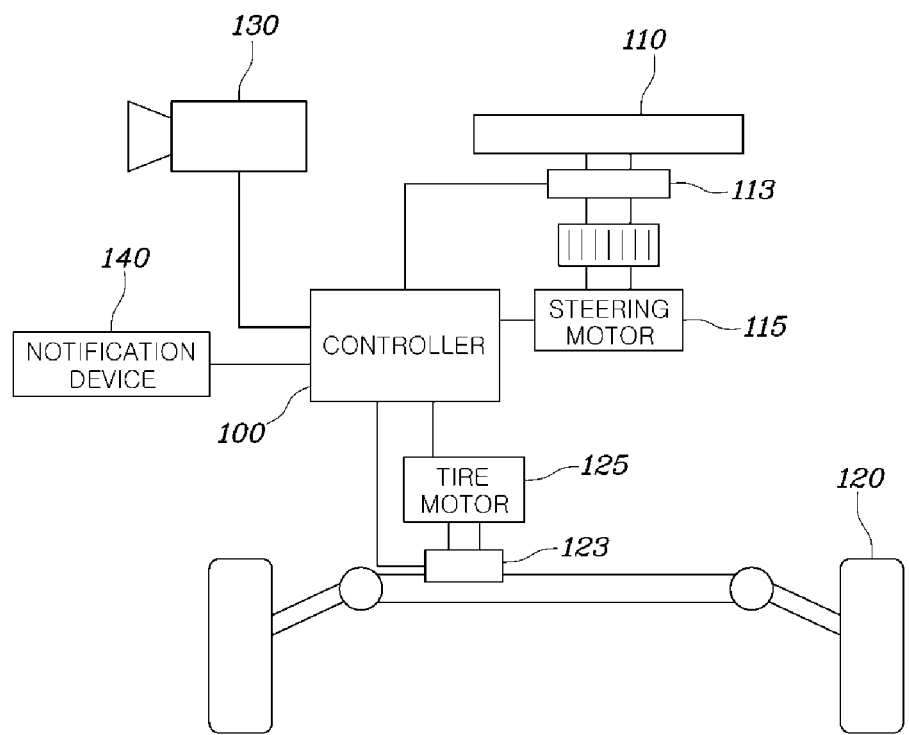
FIG. 2 is a block diagram illustrating a control apparatus for an autonomous vehicle according to an exemplary embodiment of the present invention.

FIG. 1 is a flowchart illustrating a method for controlling a manual driving mode of an autonomous vehicle according to an exemplary embodiment of the present invention, and FIG. 2 is a block diagram illustrating a control apparatus for an autonomous vehicle according to an exemplary embodiment of the present invention.

Referring to FIG. 1 and FIG. 2, a method for controlling a manual driving mode of an autonomous vehicle according to an exemplary embodiment of the present invention may include a manual mode detecting step S10 wherein a controller 100 is configured to detect whether the vehicle is switched from an autonomous driving mode to the manual driving mode; a first control step S20 wherein the controller 100 is configured to control an angle of a tire 120 and a steering angle of a steering wheel 110 based on travel route information when switching to the manual driving mode is detected as a result of the manual mode detecting step S10; a delay time determination step S30 wherein the controller 100 is configured to determine a delay time of a change of the angle of the tire 120 with respect to a change of the steering angle of the steering wheel 110 by comparing the change in the angle of the tire 120 with the change in the steering angle of the steering wheel 110 for a predetermined time period after the first control step S20; a delay time comparison step S40 wherein the controller 100 is configured to compare the determined delay time with a predetermined time period after the delay time determination step S30; a second control step S50 wherein the controller 100 is configured to control only the steering angle of the steering wheel 110 based on the travel route information when the delay time is within the predetermined time period as a result of the delay time comparison step S40; and a third control step S60 wherein the controller 100 is configured to control the angle of the tire 120 based on the steering angle of the steering wheel 110 controlled through the second control step S50.

Referring to FIG. 2, the autonomous vehicle includes a steering wheel Torque & Angle Sensor (TAS) 113 which is configured to detect the steering angle and torque of the steering wheel 110, and a steering wheel control motor 115 configured to vary the steering angle by transmitting a driving force to the steering wheel 110. The autonomous vehicle also includes a tire angle detector 123 configured to detect the steering angle of the tire 120, and a tire control motor 125 configured to apply a driving force to the tire 120, varying the angle thereof.

The controller 100 is configured to receive information related to the steering angle of the steering wheel 110 and the angle of the tire 120 from the steering wheel TAS 113 and the tire angle detector 123, and controls the steering wheel control motor 115 and the tire control motor 125 based on the received data to adjust the angles of the steering wheel 110 and the tire 120.

The controller 100 may be configured to receive the travel route information from a detecting device 130 configured to detect information related to the environmental surroundings of the vehicle, and control the steering wheel control motor 115 or the tire control motor 125 based on the received travel route information, thus implementing autonomous driving of the vehicle. Here, the detecting device 130 may include a camera and a radar system. The travel route information refers to road condition information including a nearby vehicle, a pedestrian, an obstacle, a lane, a traffic signal, etc. within approximately 60 m ahead or to the side of the vehicle.

When the vehicle is in the autonomous driving mode, the controller 100 is configured to control the tire control motor 125 based on the travel route information received from the detecting device 130, performing driving through tire angle control only.

That is, the steering wheel 110 is prevented from rotating unnecessarily in the autonomous driving mode, preventing the driver from feeling uncomfortable due to a rotation of the steering wheel 110. In addition, a system that allows the steering wheel 110 to be housed in a separate storage area in the autonomous driving mode may be employed to efficiently utilize the internal volume of the vehicle.

However, when the steering wheel 110 is kept from rotating when the vehicle is switched from the autonomous driving mode to the manual driving mode, the steering wheel 110 may become misaligned with the angle of the tire 120, and thus the driver may feel that the steering system is not working or calibrated as intended.

Accordingly, as shown in FIG. 1, the controller 100 in an exemplary embodiment of the present invention detects whether the vehicle is switched to the manual driving mode (S10), and controls not only the angle of the tire but also the steering angle of the steering wheel based on the travel route information when switching to the manual driving mode is detected (S20). That is, when the vehicle is switched to the manual driving mode, the angle of the tire and the steering angle of the steering wheel may be controlled to be aligned with each other, preventing a feeling of poor driving operability from being provoked when the driver controls the steering wheel 110 to drive the vehicle.

The controller 100 is configured to determine a delay time of the change of the steering angle of the tire with respect to the change of the steering angle of the steering wheel by comparing the change of the steering angle of the tire with the change of the steering angle of the steering wheel for a predetermined time period (S30), and determines whether the determined delay time is within a predetermined time period (S40).

That is, even when the controller 100 controls the steering angle of the tire and the steering angle of the steering wheel to be equal based on the travel route information, an error may occur in control timing. For example, when the delay time of the change of the steering angle of the steering wheel with respect to the change of the steering angle of the tire is excessively long and the change of the steering angle of the steering wheel precedes the change of the steering angle of the tire for a certain time period, the steering wheel 110 and the tire 120 may be misaligned, and thus a feeling of poor driving operability may be provoked when the driver drives the vehicle in the manual driving mode.

Accordingly, the controller 100 may determine whether the steering angle of the steering wheel 110 is aligned with the angle of the tire 120 by determining whether the delay time determined through the delay time determination step S30 is within the predetermined time period. Here, the predetermined time period may be determined wherein the delay time between the change of the steering angle of the steering wheel and the change of the angle of the tire is not excessive. Therefore, the predetermined time period varies depending on a designer or the vehicle, and thus may not be limited to a specific value or period.

When the delay time is within the predetermined time period as a result of the delay time comparison step S40, the controller 100 is configured to control only the steering angle of the steering wheel based on the travel route information (S60), and controls the angle of the tire 120 based on the change of the steering angle of the steering wheel (S70).

That is, when the delay time is within the predetermined time period, the controller 100 determines that the feeling of misalignment between the steering angle of the steering wheel 110 and the angle of the tire 120 is not provoked, and thus prohibits travel route information-based control of the angle of the tire 120 while continuously controlling the steering angle of the steering wheel 110 (S50). The present case is because a vehicle accident may occur when control of the steering wheel fails as the vehicle is suddenly switched to the manual driving mode even though the driver has not yet operated the steering wheel.

Therefore, the controller 100 preferably performs the second control step S50 and then the third control step S60 of controlling the angle of the tire 120 until confirmed that the steering wheel operation is performed by the driver.

In the present case, since the angle of the tire 120 is controlled according to the steering angle of the steering wheel 110, rather than the travel route information, the movement thereof may be controlled similar to the movement of the tire 120 when the driver is operating the steering wheel 110. Therefore, when the vehicle is switched to the manual traveling mode, provocation of the feeling of poor driving operability may be attenuated.

However, when the delay time is not within the predetermined time period as a result of the delay time comparison step S40, the controller 100 preferably performs the first control step S20 again. That is, when the delay time is not within the predetermined time period, it is determined that the steering angle of the steering wheel 110 and the angle of the tire 120 are not aligned with each other, and thus the vehicle is guided to continuously travel in the autonomous driving mode until alignment is completed.

The method of the present invention may further include a driver operation detecting step S70 wherein the controller 100 is configured to detect whether the steering wheel 110 is operated by the driver after the third control step S60; and a manual driving mode execution step S80 wherein the controller 100 is configured to terminate, when operation of the steering wheel 110 by the driver is detected as a result of the driver operation detecting step S70, control of the steering angle of the steering wheel 110 based on the travel route information and controlling the angle of the tire 120 according to the steering angle of the steering wheel 110.

In other words, the controller 100 continuously controls the steering wheel 110 based on the travel route information received from the detecting device 130. As such, when it is detected that the steering wheel 110 is operated by the driver (S70), the controller 100 terminates control of the steering wheel 110 based on the travel route information, wherein the vehicle can be completely driven by the driver in the manual driving mode.

Here, in performing the driver operation detecting step S70, the controller 100 may detect a torque value of the steering wheel 110, and detect, when the detected torque value deviates from a predetermined torque map, that the steering wheel 110 is operated by the driver.

The steering wheel torque is pre-mapped to a vehicle's speed, the steering wheel angle, and the angular velocity of the steering wheel in the controller 100. Thus, when the vehicle is in the autonomous driving mode, the controller 100 compares the steering wheel torque and the torque value of the steering wheel 110 received from the TAS 113 with the pre-mapped torque map. The controller 110 may detect that the steering wheel 110 is not in the autonomous driving mode but is operated by the driver when the steering wheel torque value deviates from the predetermined torque map.

However, when operation of the steering wheel 110 by the driver is detected as a result of the driver operation detecting step S70, the controller 100 performs the second control step S50 again. That is, when the driver does not operate the steering wheel 110, although driving in the manual driving mode is allowed, the controller 100 may continuously control the steering wheel 110 based on the travel route information, preventing the autonomous driving mode from being abruptly stopped and causing an accident.

Meanwhile, the controller may operate a notification device 140 from an initial time of execution of the first control step S20 to a time immediately before execution of the second control step S50 to let the driver recognize that the vehicle is being switched to the manual driving mode.

The notification device 140 may be a device including a warning light, a display device, or a speaker, which is provided within the vehicle and allows the driver to recognize that the vehicle is being switched to the manual driving mode.

Therefore, by operating the notification device 140 from the initial time of execution of the first control step S20 to the initial time of execution of the second control step S50, the driver may clearly understand that the manual driving mode is not yet executed due to driving in the autonomous driving mode.

As is apparent from the above description, according to a method for controlling a manual driving mode of an autonomous vehicle having the above-described structure, a feeling of poor operability may be prevented from being provoked when the vehicle is switched from the autonomous driving mode to the manual driving mode in which the driver manually performs driving. The method may improve driving performance and convenience of the vehicle, ultimately improving marketability of the vehicle.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a manual driving mode of an autonomous vehicle, the method comprising:
   a manual mode detecting step wherein a controller is configured to detect whether the vehicle is switched from an autonomous driving mode to the manual driving mode;
   a first control step wherein the controller is configured to control an angle of a tire and a steering angle of a steering wheel based on travel route information when switching to the manual driving mode is detected as a result of the manual mode detecting step;
   a delay time determination step wherein the controller is configured to determine a delay time of a change of the angle of the tire with respect to a change of the steering angle of the steering wheel by comparing the change in the angle of the tire with the change in the steering angle of the steering wheel for a predetermined time period after the first control step;
   a delay time comparison step wherein the controller is configured to compare the determined delay time with a predetermined time period after the delay time determination step;
   a second control step wherein the controller is configured to control only the steering angle of the steering wheel based on the travel route information when the delay time is within the predetermined time period as a result of the delay time comparison step; and
   a third control step wherein the controller is configured to control the angle of the tire based on the steering angle of the steering wheel controlled through the second control step.

2. The method according to claim 1, further including:
   a driver operation detecting step wherein the controller is configured to detect whether the steering wheel is operated by a driver after the third control step; and
   a manual driving mode execution step wherein the controller is configured to terminate, when operation of the steering wheel by the driver is detected as a result of the driver operation detecting step, control of the steering angle of the steering wheel using the travel route information and controlling the angle of the tire according to the steering angle of the steering wheel.

3. The method according to claim 2, wherein, in performing the driver operation detecting step, the controller is configured to detect a torque value of the steering wheel and detects, when the detected torque value deviates from a predetermined torque map, that the steering wheel is operated by the driver.

4. The method according to claim 2, wherein, when operation of the steering wheel by the driver is detected as a result of the driver operation detecting step, the controller is configured to perform the second control step again.

5. The method according to claim 1, wherein the controller is configured to operate a notification device from an initial time of execution of the first control step to a time before execution of the second control step to let a driver recognize that the vehicle is being switched to the manual driving mode.

6. The method according to claim 1, wherein, when the delay time is not within the predetermined time period as the result of the delay time comparison step, the controller is configured to perform the first control step again.

* * * * *